United States Patent
Anand et al.

(10) Patent No.: US 10,824,308 B2
(45) Date of Patent: Nov. 3, 2020

(54) SYSTEM AND METHOD OF CONTROLLING A CURSOR DISPLAY IN A CO-BROWSING COMMUNICATION SESSION

(71) Applicant: Avaya Inc., Santa Clara, CA (US)

(72) Inventors: Avinash Anand, Pune (IN); Divakar Ray, Pune (IN); Anjum Siddique, Pune (IN)

(73) Assignee: Avaya Inc., Santa Clara, CA (US)

( * ) Notice: Subject to any disclaimer, the term of this patent is extended or adjusted under 35 U.S.C. 154(b) by 354 days.

(21) Appl. No.: 15/830,932

(22) Filed: Dec. 4, 2017

(65) Prior Publication Data
US 2019/0171340 A1 Jun. 6, 2019

(51) Int. Cl.
G06F 3/0484 (2013.01)
G06F 3/0481 (2013.01)
G06Q 10/10 (2012.01)
G06F 16/904 (2019.01)

(52) U.S. Cl.
CPC ........ *G06F 3/0484* (2013.01); *G06F 3/04812* (2013.01); *G06F 3/04842* (2013.01); *G06F 16/904* (2019.01); *G06Q 10/101* (2013.01)

(58) Field of Classification Search
CPC .. G06F 3/0484; G06F 16/904; G06Q 10/101; G06F 3/04842; G06Q 10/101
See application file for complete search history.

(56) References Cited

U.S. PATENT DOCUMENTS

| 9,323,730 B2 | 4/2016 | Halevi et al. | |
| 2005/0022137 A1* | 1/2005 | Fushikida | G06F 3/016 715/823 |
| 2010/0306642 A1 | 12/2010 | Lowet et al. | |
| 2011/0191676 A1* | 8/2011 | Guttman | G06F 3/00 715/716 |
| 2014/0019870 A1* | 1/2014 | Paniagua | G06F 3/0484 715/738 |
| 2014/0028557 A1* | 1/2014 | Otake | G02F 1/13338 345/158 |
| 2014/0068511 A1* | 3/2014 | Bae | G11B 27/322 715/810 |
| 2016/0182643 A1* | 6/2016 | Badge | H04L 67/141 726/27 |
| 2016/0212184 A1 | 7/2016 | Halevi et al. | |

OTHER PUBLICATIONS

NPL-15830932 (Year: 2020).*

* cited by examiner

*Primary Examiner* — Angie Badawi
(74) *Attorney, Agent, or Firm* — Sheridan Ross P.C.

(57) ABSTRACT

A first communication endpoint determines that a co-browsing session has been established. The first communication endpoint sends contents of a displayed web page in a first browser to a second browser, which has a different display size and/or layout. The first communication endpoint detects a movement of a first cursor in the displayed web page and identifies a first user interface element that the first cursor is currently over. The first communication endpoint determines a ratio of coordinates of the first cursor in relation to a size of the first user interface element. The first communication endpoint sends an identifier for the first user interface element and the determined ratio of coordinates to the second browser. The second browser uses the determined ratio of coordinates to calculate a position of a second cursor over the first user interface element displayed in the second browser.

20 Claims, 6 Drawing Sheets

SYSTEM AND METHOD OF CONTROLLING A CURSOR DISPLAY IN A CO-BROWSING COMMUNICATION SESSION

FIELD

The disclosure relates generally to co-browsing systems and particularly to co-browsing systems that have different display sizes/layouts.

BACKGROUND

As web programming languages have evolved, such as Hyper Text Markup Language (HTML) version 5, modern web pages are sensitive to media queries based on different screen sizes of communication endpoints involved in a co-browsing session. A co-browsing session is where a second user on a second communication endpoint sees a similar view as a first user running a browser on a first communication endpoint. For example, a co-browsing session may be established between a person navigating a web site and a contact center agent. The person navigating the web page may also have a voice call with the contact center agent. This allows the contact center agent to assist the person navigating the web site. The co-browsing session allows the contact center agent to see the same user interface elements and cursor movements made by the person navigating the web site. This works fine as long as the two communication endpoints involved in the co-browsing session have similar screen sizes.

However, the use of media queries in HTML 5, causes the user interface elements, such as, icons, buttons, images, menus etc. to be located in different locations on the second communication endpoint in a co-browsing session where the screen size of the second communication endpoint is different from the first communication endpoint. For example, the first communication endpoint may be a desktop device and the second communication endpoint may be a smartphone. In this example, the locations of the user interface elements in the smartphone are not displayed in the same locations and may not have the same dimensions. The location/size differences of the user interface elements between the first communication endpoint and the second communication endpoint causes problems for correctly displaying a movement of a cursor to the second communication endpoint. For example, the cursor on the second communication endpoint may end up located over the wrong user interface element.

SUMMARY

These and other needs are addressed by the various embodiments and configurations of the present disclosure. A first communication endpoint determines that a co-browsing session has been established. The first communication endpoint sends contents of a displayed web page in a first browser to a second browser, which has a different display size and/or layout. The first communication endpoint detects a movement of a first cursor in the displayed web page and identifies a first user interface element that the first cursor is currently over. The first communication endpoint determines a ratio of coordinates of the first cursor in relation to a size of the first user interface element. The first communication endpoint sends an identifier for the first user interface element and the determined ratio of coordinates to the second browser. The second browser uses the determined ratio of coordinates to calculate a position of a second cursor over the first user interface element displayed in the second browser.

In one embodiment, a co-browsing server is used to send co-browsing information from the first communication endpoint to the second communication endpoint.

The present disclosure can provide a number of advantages depending on the particular configuration.

These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
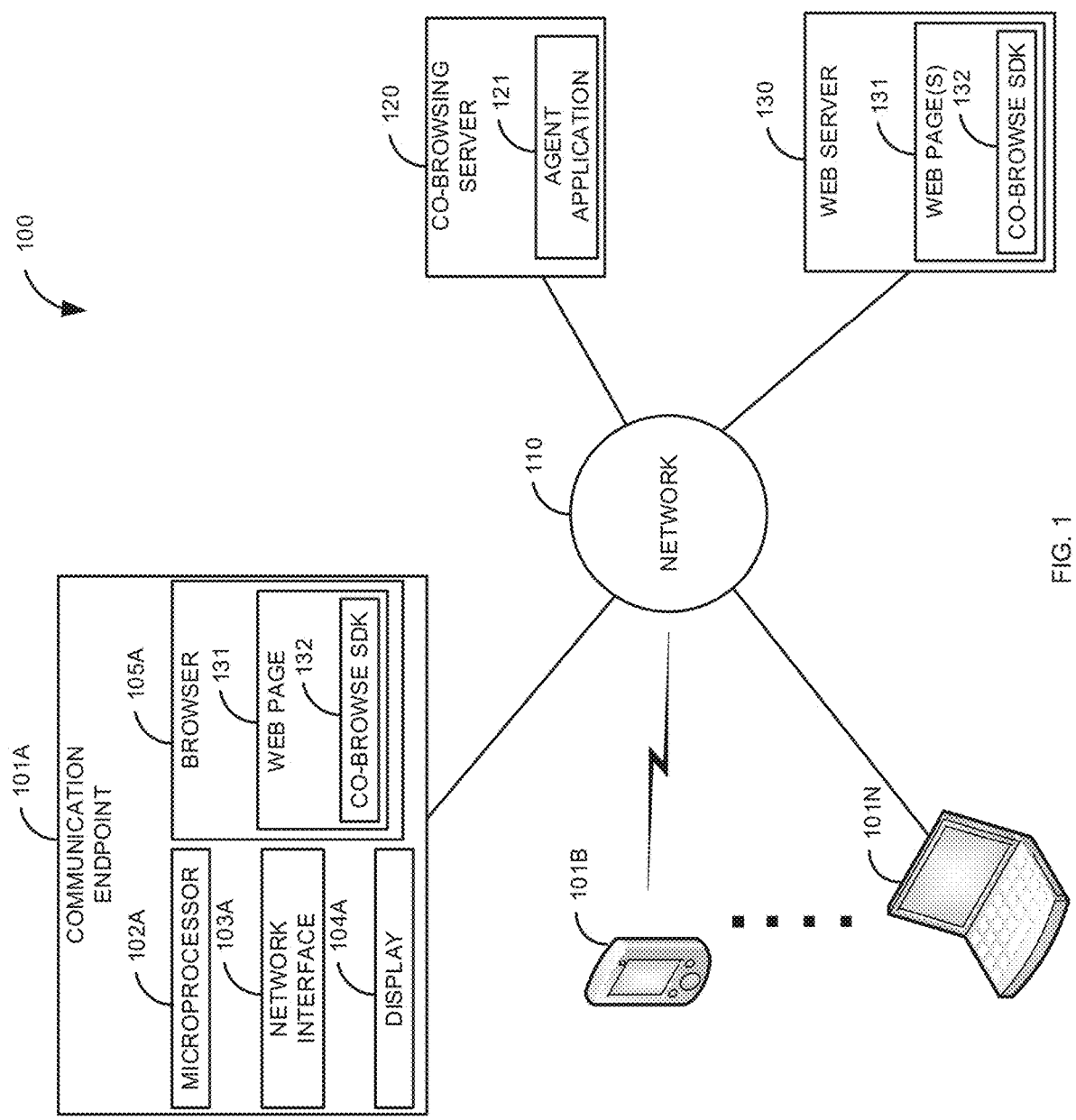
FIG. 1 is a block diagram of a first illustrative system 100 for managing cursor display in a co-browsing session.

FIG. 1 is a block diagram of a first illustrative system 100 for managing cursor display in a co-browsing session. The first illustrative system 100 comprises communication endpoints 101A-101N, a network 110, a co-browsing server 120, and a web server 130.

The communication endpoints 101A-101N can be or may include any communication endpoint device that can communicate on the network 110, such as a Personal Computer (PC), a desktop computer, a cellular telephone, a Personal Digital Assistant (PDA), a tablet device, a notebook device, a smartphone, and the like. The communication endpoints 101A-101N are devices where a communication sessions ends. The communication endpoints 101A-101N are not network elements that facilitate and/or relay a communication session in the network 110, such as a communication manager or router. As shown in FIG. 1, any number of communication endpoints 101A-101N may be connected to the network 110.

The communication endpoint 101A comprises a microprocessor 102A, a network interface 103A, a display 104A, and a browser 105A. The microprocessor 102A can be or may include any hardware processor, such as a Digital Signaling Processor (DSP), an application specific processor, a microcontroller, a multi-core processor, and/or the like.

The network interface 103A can be or may include any hardware interface coupled with software that can communicate with the network 110. For example, the network interface 103A can be a wireless network interface, a wired network interface, a fiber optic network interface, an Ethernet network interface, a cellular network interface, a WiFi network interface, and/or the like.

The display 104A can be or may include any hardware device that can display information to a user. For example, the display 104A may be a Liquid Crystal Display (LCD), a plasma display, a Light Emitting Diode (LED) display, a Cathode Ray Tube (CRT), a touch screen display, and/or the like. The display 104A is used to display web pages 131 via the browser 105A.

The browser 105A can be or may include any browser that can communicate with a web server 130, such as Google Chrome®, Microsoft Internet Explorer®, Safari®, Firefox®, Opera®, and/or the like. The browser 105A may be downloaded or pre-installed on the communication endpoint 101A.

The browser 105A is shown with a loaded web page 131. In this example, the web page 131 is a web page provided by the web server 130. The web page 131 is loaded, for example, when the user of the communication endpoint 101A enters a Uniform Resource Locator (URL) into the browser 105A.

In addition, the web page 131 comprises a co-browse Software Development Kit (SDK) 132. The co-browse SDK 132 provides an interface to establish a co-browsing session with the co-browsing server 120. In one embodiment, the co-browse SDK 132 works in a peer-to-peer configuration without the co-browsing server 120.

In FIG. 1, the communication endpoints 101B-101N are not shown with a microprocessor 102, a network interface 103, a display 104, or a browser 105 for simplicity. However, for illustrative examples discussed herein, the communication endpoints 101B-101N also comprise corresponding microprocessors 102B-102N, network interfaces 103B-103N, displays 104B-104N, and browsers 105B-105N.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), Hyper Text Markup Language (HTML), Java Script, Web Real-Time Communication (WebRTC), and/or the like. Thus, the network 110 is an electronic communication network configured to carry messages via packets and/or circuit switched communications.

The co-browsing server 120 can be or may include any server that can facilitate a co-browsing session between two or more communication endpoints 101A-101N to view web page(s) 131 provided by the web server 130. The co-browsing server 120 may be located in various places in the network 110, such as in an enterprise (e.g., a corporate server), as a cloud service, and/or the like. The co-browsing server 120 may support multiple co-browsing sessions from an individual web server 130. The co-browsing server 120 may support co-browsing sessions that involve multiple different web servers 130.

The co-browsing server 120 may also comprise an agent application 121. The agent application 121 is used by a contact center agent to generate a unique code/key that the contact center agent can send to a user of the browser 105 to establish a co-browsing session between the user at the communication endpoint 101A to the agent at another communication endpoint (e.g., communication endpoint 101N).

The web server 130 can be or may include any software/hardware that can work with the browser 105 to provide one or more web pages 131, such as Apache®, Nginx®, Microsoft-IIS®, Tomcat®, and/or the like. The web server 130 may comprise a plurality of web servers. For example, the web server 130 may comprise different web servers 130 from different companies, enterprises, groups, and/or the like. The web server 130 provides web page(s) 131 that can be viewed by a user running a browser 105 on a communication endpoint 101.

The web page(s) 131 further comprise the co-browse Software Development Kit (SDK) 132. The co-browse SDK 132 provides a group of Application Programming Interfaces (APIs) that are used to establish a co-browsing session with the co-browsing server 120. For example, a user may enter a code/key, provided by a contact center agent, into a web page 131 displayed in the browser 105 to establish a co-browsing session. The entered code/key is used by the co-browse SDK 132 to establish the co-browsing session with the co-browsing server 120. The co-browse SDK 132 provides a mechanism to send code to the co-browsing server 120 that allows the contact center agent to see the same or a similar view as the user is seeing in the browser 105A.

In one embodiment, the web server 130 may be located on the co-browsing server 120. For example, an enterprise (e.g., a corporation) may host the web server 130 and the co-browsing server 120 in a single server as part of a unified service. Alternatively, the co-browsing server 120 may be provided by a first enterprise and the web server 130 is provided by a second enterprise.

Figure 2:
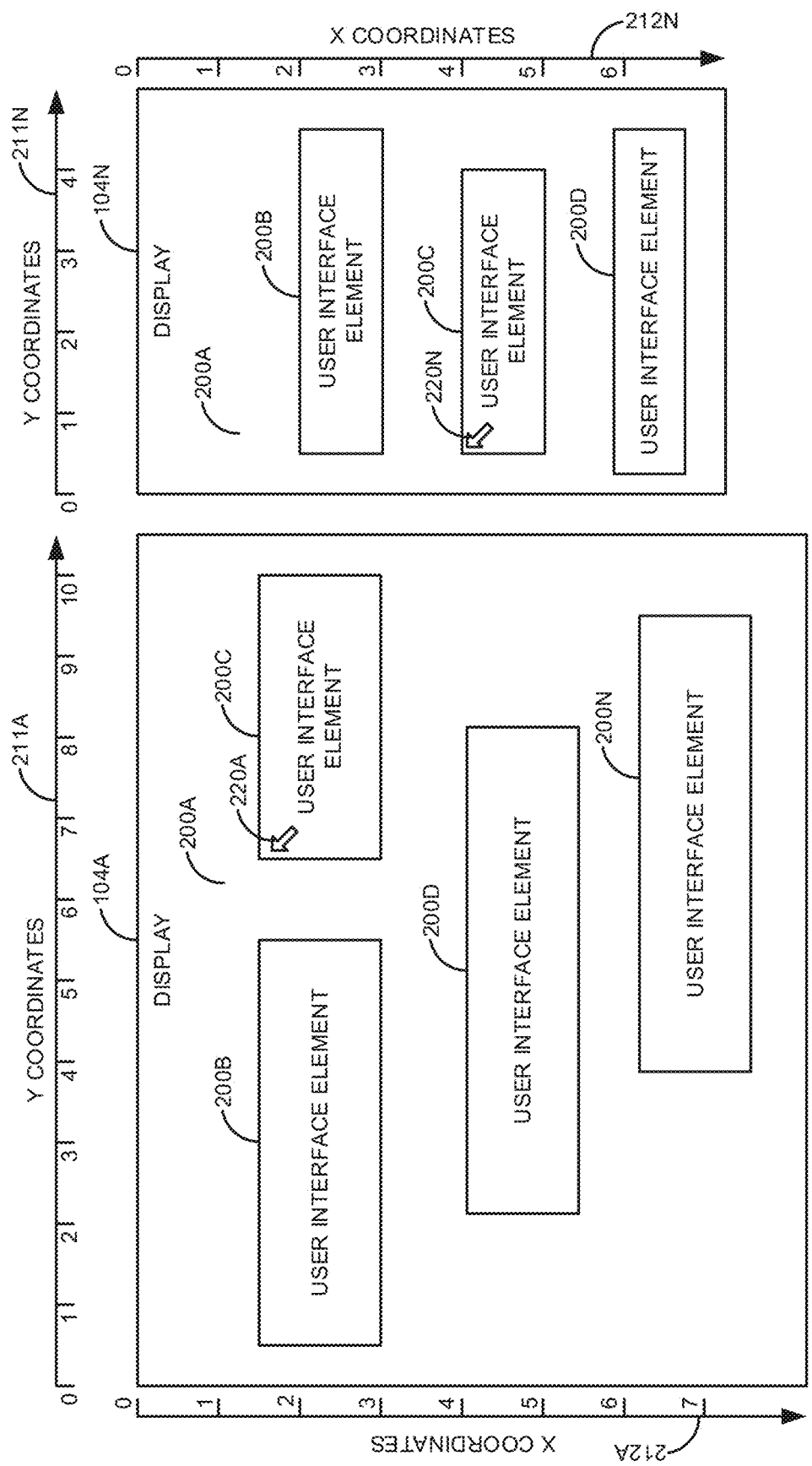
FIG. 2 is a block diagram that illustrates differences of locations of user interface elements in a co-browsing session.

FIG. 2 is a block diagram that illustrates differences of locations of user interface elements 200A-200N in a co-browsing session. In FIG. 2, the displays 104A and 104N represent different views of a co-browsing session where the two communication endpoints (101A and 101N) in the co-browsing session have different sized displays 104A and 104N. In FIG. 2, the view displayed in the display 104A has been replicated and reformatted to the view displayed in the display 104N.

The display 104A represents a display of a large screen communication endpoint 101A, such as a desktop computer with a high resolution display 104A. The display 104A is a display of the browser 105A displaying the web page 131. The display 104A comprises user interface elements 200A-200N and a cursor 220A.

The user interface element 200A is a background user interface element 200A, such as, a pane or panel that provides the background for the browser 105A. The user interface elements 200B-200N are user interface elements that are shown on top of the user interface element 200A. For example, the user interface elements 200B-200N may be a button, a menu, an icon, an image, a tab, a text box, a text field, an animation and/or the like.

The cursor 220A is a cursor that can be moved around the display 104A by a user based on input from a user input device, such as a mouse, a track ball, a controller, a touch screen, and/or the like.

The display 104N represents a display of a small screen communication endpoint 101N, such as a smartphone or tablet device. The display 104N is a replicated view the display 104A of the user of the communication endpoint 101A browsing the web page 131. The display 104N comprises the user interface elements 200A-200D and a cursor 220N. Since the display 104N is much smaller and oriented differently from display 104A, the locations of the user interface elements 200A-200D in the display 104N are different sizes and in different locations. In addition, because of the size and/or orientation differences, the user interface element 200 N is not currently displayed in the display 104N.

As the user of the communication endpoint 101A moves the cursor 220A, the cursor 220N should track the cursor 220A. For example, as shown in FIG. 2, both the cursors 220A and 220N are similarly positioned over the user interface element 200C.

The displays 104A and 104N have defined X coordinates 212A and 212N and Y coordinates 211A and 211N that are illustratively used to identify locations for the cursors 220A and 220N and user interface elements 200A-200N. The Y coordinates 211A of the display 104A have coordinates from 0 to 10. The X coordinates 212A of the display 104A have coordinates from 0 to 7. The Y coordinates 211N of display 104N have coordinates from 0 to 4. The X coordinates 212N of the display 104N have coordinates from 0 to 6.

Figure 3:
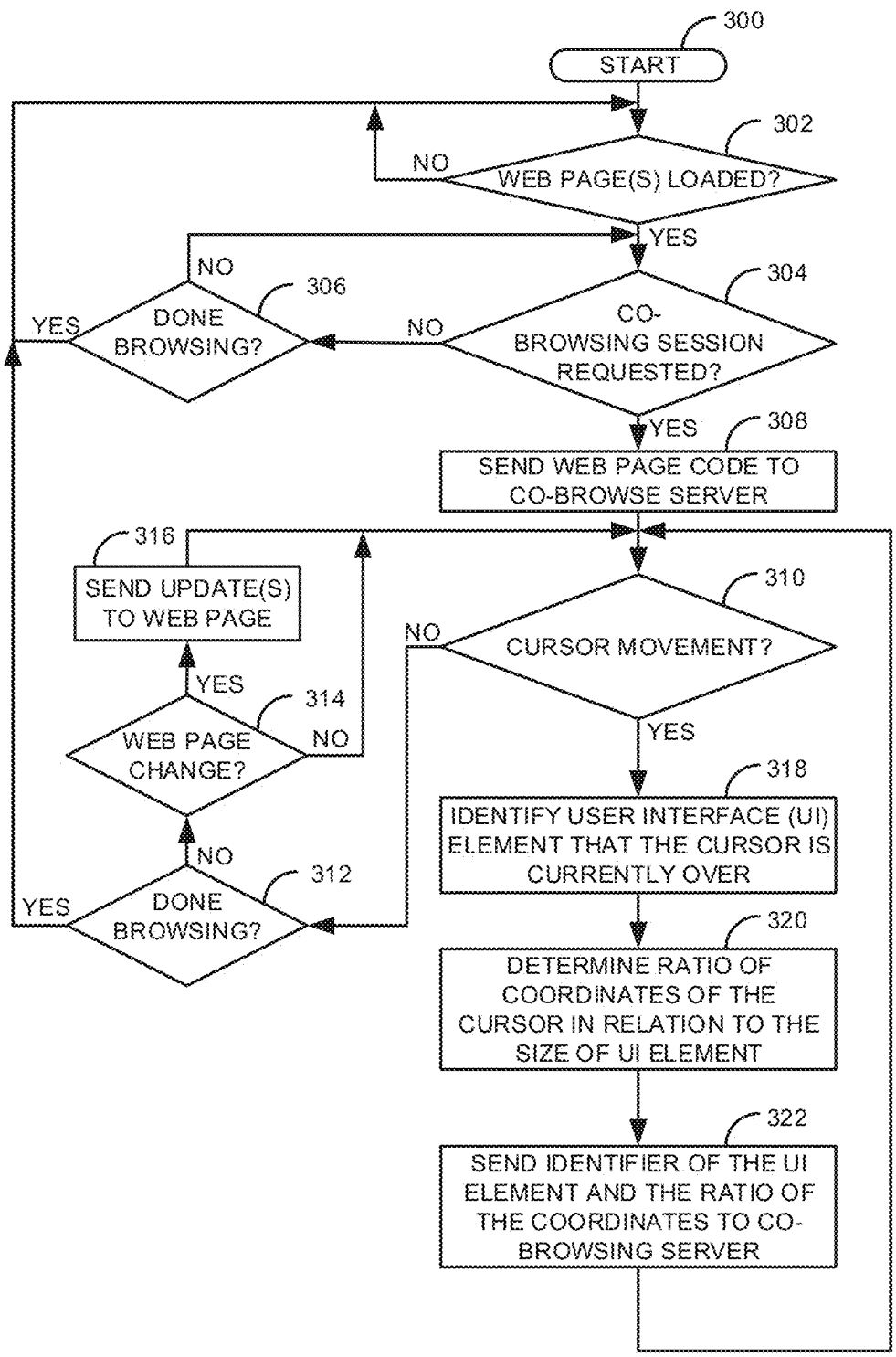
FIG. 3 is a flow diagram of a process for managing cursor display in co-browsing session.

FIG. 3 is a flow diagram of a process for managing cursor 220 display in co-browsing session. Illustratively, the communication endpoints 101A-101N, the network interfaces 103A-103N, the browsers 105A-105N, the co-browsing server 120, the agent application 121, the web server 130, the web pages 131, and the co-browse SDK 132 are stored-program-controlled entities, such as a computer or microprocessor, which performs the method of FIGS. 3-6 and the processes described herein by executing program instructions stored in a computer readable storage medium, such as a memory (i.e., a computer memory, a hard disk, and/or the like). Although the methods described in FIGS. 3-6 are shown in a specific order, one of skill in the art would recognize that the steps in FIGS. 3-6 may be implemented in different orders and/or be implemented in a multi-threaded environment. Moreover, various steps may be omitted or added based on implementation.

The process of FIG. 3 is from the perspective of the communication endpoint 101A that provides the display 104A for the co-browsing session with the communication endpoint 101N as shown in FIG. 2. The process of FIG. 3 is where the co-browsing server 120 is used to establish a co-browsing session between the communication endpoints 101A and 101N.

The process starts in step 300. The browser 105A waits to see if a web page 131 has been loaded in step 302. If a web page 131 has not been loaded in step 302, the process of step 302 repeats. If a web page 131 has been loaded in step 302, the browser 105A, determines if a co-browsing session has been requested in step 304. If a co-browsing session has not been requested in step 304, the browser 105A determines if the user is done browsing in step 306. For example, the user may have closed down the browser 105A. If the user is done browsing in step 306, the process goes to step 302. Otherwise, if the user is not done browsing in step 306, the process goes back to step 304.

If a co-browsing session has been requested in step 304 (e.g., between the communication endpoint 101A and 101N), the process goes to step 308. For example, the user may request a co-browsing session by typing in a code/key (generated by the agent application 121) received from a contact center agent (e.g., via a phone call or chat session) into the web page 131 displayed in the browser 105A. Alternatively, the user may provide a URL, IP address, Uniform Resource Identifier (URI) to identify the second communication endpoint 101 in a peer-to-peer co-browsing session. The co-browse SDK 132 interfaces with the co-browsing server 120 or other browser 105N (peer-to-peer) to establish the co-browsing session.

The co-browse SDK 132 sends the displayed web page 131 (e.g., the HTML/java script code for the web page 131) to the co-browsing server 120 in step 308. The browser 105A determines, in step 310, if the cursor 220A is being moved by the user. If the cursor 220A is not being moved in step 310, the process goes to step 312. In step 312, the browser 105A determines if the user is done browsing. If the user is done browsing in step 312, the process goes back to step 302. Otherwise, if the user is not done browsing in step 312, the co-browse SDK 132 determines if the web page 131 has changed in step 314. For example, the change in the web page 131 may be where the user has changed to a different web page 131, where an animation has changed, where a selected menu has been displayed, and/or the like. If the web page 131 has not changed in step 314, the process goes back to step 310. If the web page 131 has changed in step 314, the co-browse SDK 132 sends web page 131 update(s) to the co-browsing server 120 in step 316 and the process goes back to step 310. The update(s) sent in step 316 may indicate that an event occurred (e.g., the user selected a menu). If the updates are that the user navigated to another web page 131, the updates may be to send the web page code (e.g., like in step 308).

The processes of detecting cursor 220 movement in step 310 and detecting web page 131 changes in step 314 are shown as a serial process. However, the process of detecting the cursor 220 movement in step 310 and the process of detecting web page changes may be implemented on separate computer threads.

If there is cursor 220 movement in step 310, the co-browsing SDK 132 identifies the user interface element 200A-200N that the cursor 220A is currently over in step 318. For example, as shown in FIG. 2, the cursor 220A is over the user interface element 200C. The co-browsing SDK 132 determines the ratio of coordinates of the cursor 220A in relation to the size of the user interface element 200C in step 320.

In one embodiment, the determined ratio of coordinates of the cursor 220A in relation to the size of the user interface element 220C is calculated as follows. The calculations are based on the X coordinates 212A and Y coordinates 211A of the display 104A as shown in FIG. 2.
  1. Calculate the cursor 220A's coordinates caX, caY in the display 104A. (caX=1.7 and caY=6.6)
  2. Find the user interface element (200C) that the cursor 220A is currently over.
  3. Find the starting coordinates aX and aY of the user interface element 200 C in the display 104A. (aX=1.5, aY=6.5)
  4. Find the length and height of the user interface element 200C eaX, eaY. (eaX=1.5 and eaY=3.5)
  5. Calculate the location of cursor 220A relative to the user interface element 200C in the display 104A. $rcaX_c=(caX-aX)$, $rcaY_c=(caY-aY)$. ($rmX_c=(1.7-1.5)=0.2$, $rmY_c=6.6-6.5=0.1$)
  6. Calculate the ratio of the cursor 220A in the display 104A with respect to the calculation of step 5 with length and height of user interface element 200C $rmXc/aX$ $(0.2/1.5)=0.133$, $rmY_c/aY$ $(0.1/3.5=0.029)$.

In one embodiment, the calculation of step 6 is used by the co-browse SDK 132 to send a Java Script Object Notation (JSON) call like {relativeCursorX: '0.133', relativeCursorY: '0.029', element: 'object identifier of user interface element 200C', mediaQuery: '1024-780' }. The JASON media query is then sent to the co-browsing server 120 during co-browsing session in step 322. The process then goes back to step 310 to see if the cursor 220A is still moving.

In addition to the ratio of the coordinates, other information may also be sent in step 322. In one embodiment, information about the direction of the cursor 220A can be captured and sent in step 322. For example, if the cursor 220A is moving horizontally from the user interface element 200B to the user interface element 200C, a projected next user interface element (200C in this case) may be sent. The projected next user interface element information is used in the display 104N to move the cursor 220N in the direction of the projected user interface element 200C. In this example, the cursor 220A is moving in a horizontal direction from the user interface element 200B to the user interface element 200C. The cursor 220N would be displayed as moving a vertical direction from the user interface element 200B toward the user interface element 200C.

Although FIG. 3 is discussed using a co-browsing server 120, one of skill in the art would understand that instead of sending information to the co-browsing server 120, the information can be sent directly to one or more other browser(s) 105 involved in the co-browsing session.

Figure 4:
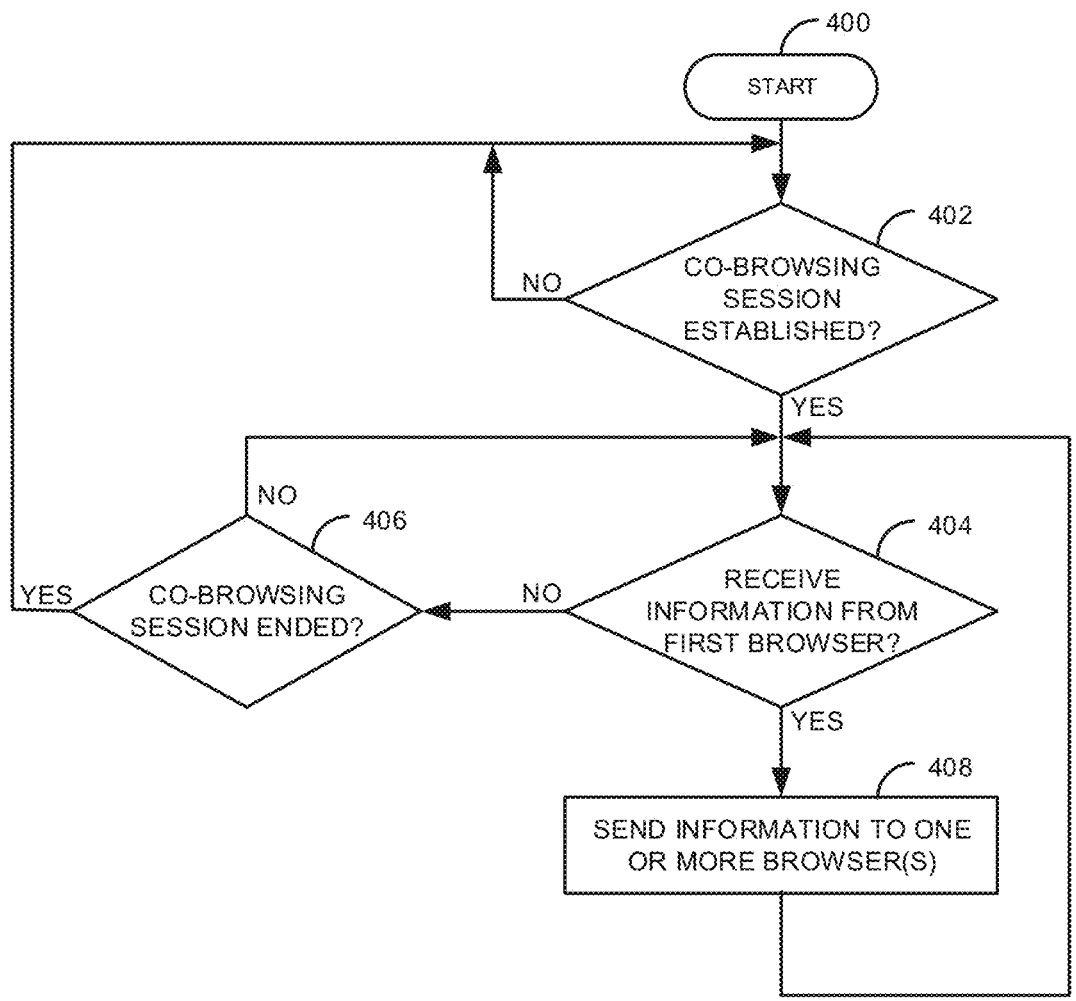
FIG. 4 is a flow diagram of a process used by a co-browsing server in a co-browsing session.

FIG. 4 is a flow diagram of a process used by a co-browsing server 120 in a co-browsing session. The process of FIG. 4 is from the perspective of the co-browsing server 120. The process starts in step 400. The co-browsing server 120 determines in step 402 if a co-browsing session has been established in step 402. If a co-browsing session has not been established in step 402, the process repeats step 402.

Otherwise, if the co-browsing session has been established in step 402, the co-browsing server 120 determines in step 404 if information has been received from the browser 105A. For example, the received information in step 404 may be the information sent in steps 308, 316, and 322. If information is not received in step 404, the co-browsing server 120 determines if the co-browsing session has ended in step 406. For example, the user of the browser 105A has closed the browser 105A. If the co-browsing session has ended in step 406, the process goes back to step 402. Otherwise, if the co-browsing session has not ended in step 406, the process goes back to step 404.

If information has been received from the browser 105A in step 404, the co-browsing server 120 sends (forwards), in step 408, the information received in step 404 to the browser 105N. In one embodiment, where there are more than two browsers 105 involved in the co-browsing session, the information may be sent to two or more other browsers 105.

In one embodiment, the co-browsing server 120 may modify the information sent in step 408. For example, based on a defined profile associated with a particular web page 131, the co-browsing server 120 may change a color, a font, an animation (e.g., to flash text), a background color, and/or the like of a user interface element 200.

In one embodiment, the modifications may be based on capabilities of the communication endpoint 101N. For example, the communication endpoint 101N may have a limited font capability or color scheme.

In one embodiment, the modifications may be based on the user of the communication endpoint 101N. For example, the user of the communication endpoint 101N may have a sight impairment that requires larger fonts so that the user can view the web page 131.

In another embodiment, the co-browsing server 120 may modify a color/font attribute of a text field to alert a user of the browser 105N to a specific user interface element 200 in the display 104N. In all the above examples, the actual code sent in steps 308/316 may be changed.

In one embodiment, the modification may be based on an event sent in step 316. For example, if the event is where the user selected a menu, the modification may be to highlight (e.g. flash) a specific menu item. The highlighting can alert a contact center agent (using the browser 105N) to suggest that the user (where a voice call is also active) to select the highlighted menu item.

Alternatively, the co-browsing server 120 may add additional user interface element(s) 200 to be displayed in the display 104N, such as a window, a title, a button, an animation, a text field, and/or the like. For example, the co-browsing server 120 may add a pop-up window that alerts a user of the browser 105N (e.g., a contact center agent) of an issue that is associated with a specific user interface element 200 (e.g., a menu or menu item). In one embodiment, code (e.g., HTML/java script code) for displaying the additional user interface element(s) 200 is sent in step 408.

In one embodiment, the added information may be a message. For example, the co-browsing server 120 may send a message for the browser 105N to play a voice message (e.g., a media file), to vibrate a vibrator, to pop-up a window and play a video file, and/or the like.

Figure 5:
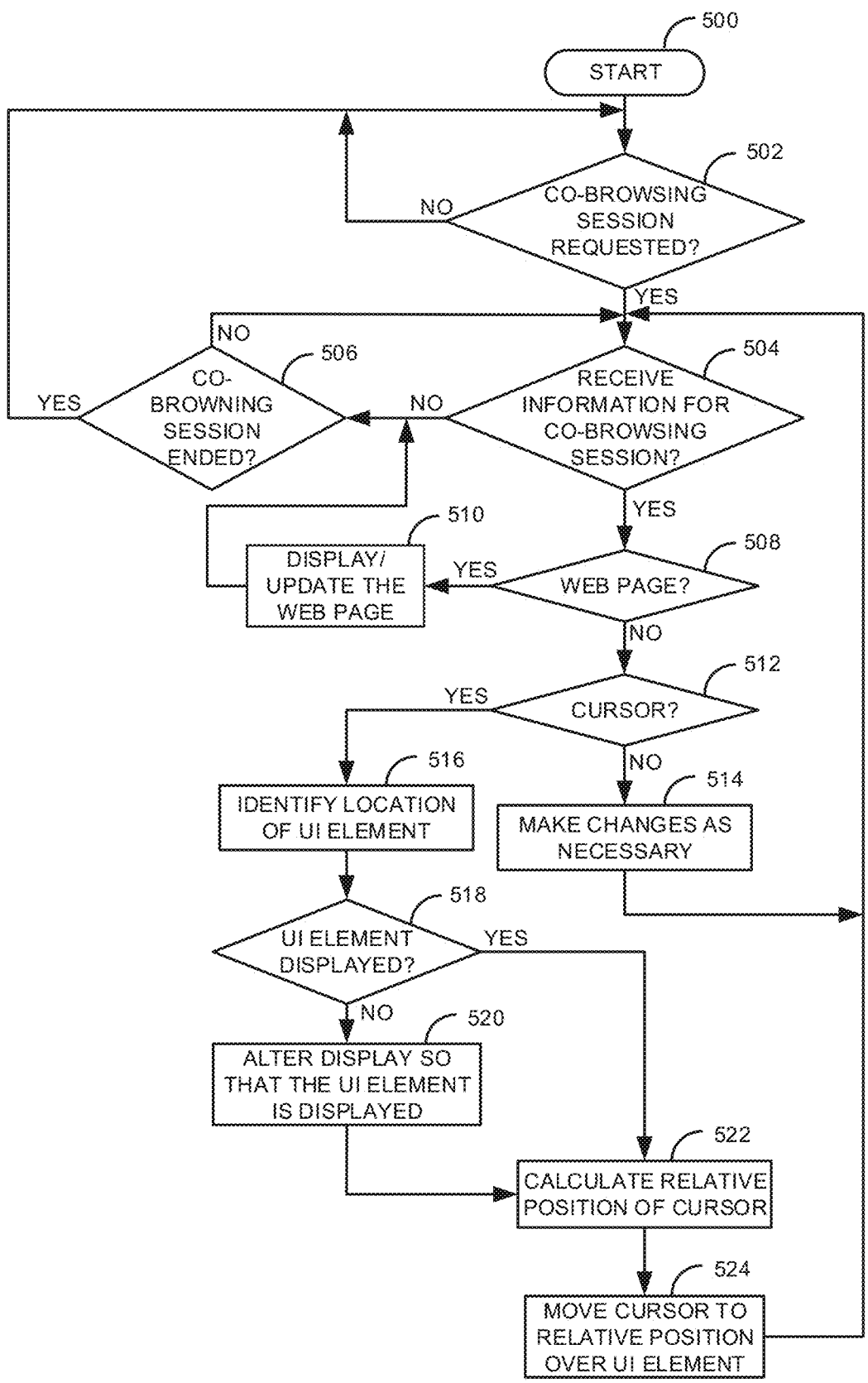
FIG. 5 is a flow diagram of a process for managing cursor display in a co-browsing session.

FIG. 5 is a flow diagram of a process for managing cursor 220 display in a co-browsing session. The process of FIG. 5 is from the perspective of the communication endpoint 101N that receives the information sent in steps 308, 316, and 322 to the communication endpoint 101A, via the co-browsing server 120.

The process starts in step 500. The browser 105N determines, in step 502, if a co-browsing session has been requested. If a co-browsing session has not been requested in step 502, the process repeats step 502. Otherwise, if a co-browsing session has been requested in step 502, the browser 105N wait to receive information for the co-browsing session in step 504 (i.e., the information sent in steps 308, 316, and 322 by the browser 105A that is forwarded by the co-browsing server 120 in step 408). If information has not been received from the co-browsing server 120, in step 504, the browser 105N determines if the co-browsing session has ended in step 506. If the co-browsing session has ended in step 506, the process goes back to step 502. Otherwise, if the co-browsing session has not ended in step 506, the process goes back to step 504.

If information is received from the co-browsing server 120 in step 504, the browser 105N determines, in step 508, if the information is to display or update the display of the web page 131 (i.e., the web page code sent in step 308 or the update(s) sent in step 316). If the information is to display or update the display of the web page 131 in step 508, the browser 105N displays/updates the web page 131 in step 510. The process then goes to step 506.

Otherwise, if the information is not to display/update the web page 131 in step 508, the browser 105N determines, in step 512, if the information is the cursor information sent in step 322. If the information is not the cursor information sent in step 322, the browser 105N makes changes as necessary in step 514. For example, the co-browsing server 120 may send message, in step 514, to perform an action on the browser 105N, such as, to play a media file (voice and/or video), to have a vibrator vibrate, and/or the like. The process then goes back to step 504.

Otherwise, if the information is to update the location of the cursor 220N in step 512, the process goes to step 516. As discussed in FIG. 3, step 332, the identifier of the user interface element 200C is sent along with the ratio of the coordinates of the cursor 220A and received in step 504. For example, the ratio of the coordinates of the cursor 220A can be sent in the JSON call {relativeCursorX: '0.133', relativeCursorY: '0.029', element: 'object identifier of the user interface element 200C', mediaQuery: '1024-780' }.

The browser 105N identifies, in step 518, if the location of the user interface element 200C is displayed in the display 104N. In FIG. 2, the user interface element 200C is displayed, so the process goes to step 522. However, the user interface element 200 may not be displayed in the display 104N because of a smaller/different screen size. For example, in FIG. 2, the user interface element 200N is visible in the display 104A and is not visible in the display 104N. If the user interface element 200 is not displayed in step 518, the browser 105N alters the display 104N, in step 520, so that the user interface element 200 is displayed and the process goes to step 522. The browser 105N calculates the relative position of the cursor 220N. For example, the calculated relative position of the cursor 220N may be calculated as follows based on FIG. 2 and the received information from the JSON call discussed above with received ratios $racX_c$ (0.133) and $racY_c$ (0.029).

1. Find the user interface element 200C based on the object identifier of the user interface element 200C.
2. Find the starting coordinates nX and nY of the user interface element 200C in the display 104N. (nX=4 and nY=0.5)
3. Find the height and length of the user interface element 200C in the display 104N (enX, enY) enX=1, enY=3.5.
4. Calculate the location of cursor 220N using the received ratios $racX_c$ (0.133), $racY_c$ (0.029). nXc= ($racX_c$*enX)+nX (0.133*1)+4=4.133), nYc= ($racY_c$*enY)+yX) (0.029*3.5)+1=1.1015)

The browser 105N then moves the displayed cursor 220N, in step 524 to the calculated location nXc (4.133), nYc (1.1015) as shown in FIG. 2. The process then goes back to step 504.

One of skill in the art would understand that the process of a user moving the cursor 220A across the user interface elements 200A-200N will cause the multiple ratios to be calculated as the user moves the cursor 220A across each of the different user interface elements 200A-200N. This allows the cursor 220N to replicate the movements of the cursor 220A.

In one embodiment, instead of altering the display in step 520 when the user interface element 220 is not displayed, the process may go directly to step 504 and not calculate the relative position of the cursor 220N.

Although the examples discussed in FIGS. 3-5 are discussed where the co-browsing session is between two communication endpoints 101A and 101N, one of skill in the art would understand that a co-browsing session may be between three or more communication endpoints 101A-101N.

Figure 6:
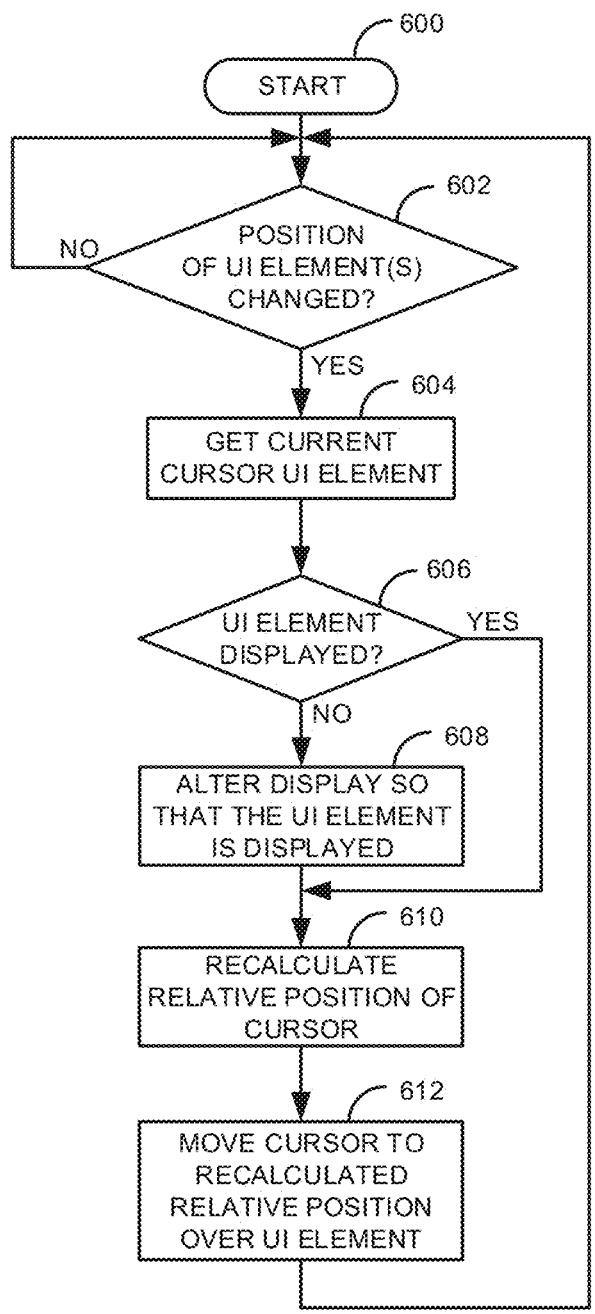
FIG. 6 is a flow diagram of a process for moving a cursor when a location of a user interface object changes position in a co-browsing session.

FIG. 6 is a flow diagram of a process for moving a cursor 220N when a location of a user interface object 200 changes position in a co-browsing session. The process of step 600 may be implemented a thread on a multi-threaded operating system. The process starts in step 600. The browser 105N determines, in step 602, if a position of a user interface element 200 in the display 104N has changed. For example, a user may move their mobile device from a vertical position to a horizontal position or from a horizontal position to a vertical position. The rotation of the communication endpoint 101N causes the user interface elements 200A-200N to change position in the communication endpoint 101N. If the rotation is not taken into account, the cursor 220N will not be located in the right location. If the position of the user interface element(s) 200 have not changed position in step 602, the process repeats step 602.

If a user interface element(s) 200 has changed position in step 602, the browser 105N gets, in step 604, the current cursor user interface element 200 that the cursor 220A is currently over. For example, based on the last user interface element identifier sent in step 322. The browser 105N identifies, in step 606, if the location of the user interface element 200C is displayed in the display 104N. In FIG. 2, the user interface element 200C is displayed, so the process goes to step 610. However, the user interface element 200 may not be displayed in the display 104N because of a smaller/different screen size. For example, in FIG. 2, the user interface element 200N is visible in the display 104A and is not visible in the display 104N. If the user interface element 200 is not displayed in step 606, the browser 105N alters the display 104N, in step 608, so that the user interface element 200 is displayed and the process goes to step 610.

The browser 105N recalculates the relative position of the cursor 220N in step 610 (e.g., as discussed above in step 522). The browser 105N then moves the cursor 220N, in step 612, to the recalculated location nXc, nYc (e.g., as discussed in step 524). The process then goes to back to step 602.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A co-browsing server comprising:
a microprocessor; and
a computer readable medium, coupled with the microprocessor and comprising microprocessor readable and executable instructions that program the microprocessor to:
determine that a co-browsing server has established a co-browsing session between a first browser in a first communication endpoint and a second browser in a second communication endpoint;
receive, from the first browser, contents of a displayed web page in the first browser, wherein at least one of a display size or layout of the displayed web page in the first browser is different from at least one of a display size or layout of a web page display of the second browser;
send, to the second browser, the contents of the displayed web page in the first browser;
receive, from the first browser, an identifier of a first user interface element and a determined ratio of coordinates of a first cursor, comprising a ratio of coordinates comprising a first ratio and a second ratio, wherein the first ratio comprises the ratio of the position of first cursor on the first user interface element to the size of the first interface element along an X coordinate and wherein the second ratio comprises the ratio of the position of the first cursor on the first user interface element to the size of the first interface element along a Y coordinate; and
send, to the second browser, the identifier of the first user interface element and the determined ratio of coordinates of the first cursor and wherein the second browser uses the determined ratio of coordinates of the first cursor to calculate a position of a second cursor for presentation over a second user interface element comprising a representation of the first user interface element as displayed in the second browser.

2. The co-browsing server of claim 1, wherein the displayed web page in the first browser comprises a plurality of individual user interface elements that the first cursor is moved over and wherein a plurality of individual determined ratios of coordinates of the first cursor in relation to a size of the plurality of individual user interface elements along each of the X coordinate and the Y coordinate, respectively, are used to calculate a plurality individual of positions of the second cursor over the plurality of individual user interface elements displayed in the second browser.

3. The co-browsing server of claim 1, wherein the received determined ratio of coordinates of the first cursor is in Java Script Object Notation (JASON) with a relative cursor X coordinate, a relative cursor Y coordinate, and a screen size resolution.

4. The co-browsing server of claim 1, wherein the second browser dynamically uses the determined ratio of coordinates of the first cursor to calculate a position of the second cursor in the second browser over the second user interface element when a coordinate of the second user interface element changes in the display of the second browser.

5. The co-browsing server of claim 1, wherein the second browser determines that the second user interface element is not currently displayed on the second communication endpoint and in response, the second browser alters the display on the second browser to display the second user interface element in the second browser.

6. The co-browsing server of claim 1, wherein the first cursor in the first browser moves in a horizontal direction and the second cursor moves in a vertical direction in the second browser.

7. The co-browsing server of claim 1, wherein the co-browsing server adds to or modifies the contents of the sent web page displayed in the first browser.

8. A method comprising:
   determining, by a microprocessor, that a co-browsing session has been established, via a co-browsing server, between a first browser in a first communication endpoint and a second browser in a second communication endpoint;
   receiving, by the microprocessor, from the first browser, contents of a displayed web page in the first browser, wherein at least one of a display size or layout of the displayed web page in the first browser is different from at least one of a display size or layout of a web page display of the second browser;
   sending, by the microprocessor, to the second browser, the contents of the displayed web page in the first browser;
   receiving, by the microprocessor, from the first browser, an identifier of a first user interface element and a determined ratio of coordinates of a first cursor, comprising a ratio of coordinates comprising a first ratio and a second ratio, wherein the first ratio comprises the ratio of the position of first cursor on the first user interface element to the size of the first interface element along an X coordinate and wherein the second ratio comprises the ratio of the position of the first cursor on the first user interface element to the size of the first interface element along a Y coordinate; and
   sending, by the microprocessor, to the second browser, the identifier of the first user interface element and the determined ratio of coordinates of the first cursor and wherein the second browser uses the determined ratio of coordinates of the first cursor to calculate a position of a second cursor for presentation over a second user interface element comprising a representation of the first user interface element as displayed in the second browser.

9. The method of claim 8, wherein the displayed web page in the first browser comprises a plurality of individual user interface elements that the first cursor is moved over and wherein a plurality of individual determined ratios of coordinates of the first cursor are used to calculate a plurality individual of positions of the second cursor over the plurality of individual user interface elements displayed in the second browser.

10. The method of claim 8, wherein the received determined ratio of coordinates of the first cursor is in Java Script Object Notation (JASON) with a relative cursor X coordinate, a relative cursor Y coordinate, and a screen size resolution.

11. The method of claim 8, wherein the second browser dynamically uses the determined ratio of coordinates of the first cursor to calculate a position of the second cursor in the second browser over the second user interface element when a coordinate of the second user interface element changes in the display of the second browser.

12. The method of claim 8, wherein the second browser determines that the first second interface element is not currently displayed on the second communication endpoint and in response, the second browser alters the display on the second browser to display the second user interface element.

13. A first communication endpoint comprising:
   a microprocessor; and
   a computer readable medium, coupled with the microprocessor and comprising microprocessor readable and executable instructions that program the microprocessor to:
   determine that a co-browsing session has been established, wherein the co-browsing session is between a first browser in the first communication endpoint and a second browser in a second communication endpoint;
   send contents of a displayed web page in the first browser to the second browser, wherein at least one of a display size or layout of the displayed web page in the first browser is different from at least one of a display size or layout of a web page display of the second browser;
   detect a movement of a first cursor in the displayed web page in the first browser;
   identify a first user interface element that the first cursor is currently over;
   determine a ratio of coordinates, comprising a first ratio and a second ratio, wherein the first ratio comprises the ratio of the position of first cursor on the first user interface element to the size of the first interface element along an X coordinate and wherein the second ratio comprises the ratio of the position of the first cursor on the first user interface element to the size of the first interface element along a Y coordinate; and
   send an identifier for the first user interface element and the determined ratio of coordinates of the first cursor to the second browser, wherein the second browser uses the determined ratio of coordinates of the first cursor to calculate a position of a second cursor for presentation over a second user interface element comprising a representation of the first user interface element as displayed in the second browser.

14. The first communication endpoint of claim 13, wherein the displayed web page in the first browser comprises a plurality of individual user interface elements that the first cursor is moved over and wherein a plurality of individual determined ratios of coordinates of the first cursor in relation to a size of the plurality of individual user interface elements along each of the X coordinate and the Y coordinate, respectively, are used to calculate a plurality individual of positions of the second cursor over the plurality of individual user interface elements displayed in the second browser.

15. The first communication endpoint of claim 13, wherein the co-browsing session is established between the first communication endpoint and the second communication endpoint via a co-browsing server, wherein the sent contents of the displayed web page are sent to the second browser via the co-browsing server, and wherein the sent identifier for the first user interface element and the determined ratio of coordinates of the first cursor are sent to the second browser via the co-browsing server.

16. The first communication endpoint of claim 13, wherein the determined ratio of coordinates of the first cursor is sent in Java Script Object Notation (JASON) with a relative cursor X coordinate, a relative cursor Y coordinate, and a screen size resolution.

17. The first communication endpoint of claim 13, wherein the second browser dynamically uses the determined ratio of coordinates of the first cursor to calculate a position of the second cursor in the second browser over the second user interface element when a coordinate of the second user interface element changes in the display of the second browser.

18. The first communication endpoint of claim 17, wherein the coordinate of the first user interface element changes in the display of the second browser when a user rotates the second communication endpoint from vertical view to a horizontal view or from the horizontal view to the vertical view.

19. The first communication endpoint of claim 13, wherein the second browser determines that the second user interface element is not currently displayed on the second communication endpoint and in response, the second browser alters the display on the second browser to display the second user interface element.

20. The first communication endpoint of claim 13, wherein the first cursor in the first browser moves in a horizontal direction and the second cursor moves in a vertical direction in the second browser.

* * * * *

UNITED STATES PATENT AND TRADEMARK OFFICE
CERTIFICATE OF CORRECTION

PATENT NO. : 10,824,308 B2  
APPLICATION NO. : 15/830932  
DATED : November 3, 2020  
INVENTOR(S) : Avinash Anand, Divakar Ray and Anjum Siddique Page 1 of 1

It is certified that error appears in the above-identified patent and that said Letters Patent is hereby corrected as shown below:

In the Claims

At Column 14, Line 43, after "a determined ratio of coordinates" please add --,-- therein.

At Column 16, Line 16, please delete "first" therein.

At Column 16, Line 16, after "second" please add --user-- therein.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*